(12) United States Patent
Handa

(10) Patent No.: US 6,695,329 B2
(45) Date of Patent: Feb. 24, 2004

(54) SADDLE TYPE VEHICLE

(75) Inventor: Akio Handa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 145 days.

(21) Appl. No.: 09/805,943

(22) Filed: Mar. 15, 2001

(65) Prior Publication Data

US 2001/0048207 A1 Dec. 6, 2001

(30) Foreign Application Priority Data

Mar. 15, 2000 (JP) ........................................ 2000-072361
Dec. 8, 2000 (JP) ........................................ 2000-373986

(51) Int. Cl.$^7$ ................................................ B60G 3/18
(52) U.S. Cl. ........................ 280/124.135; 280/124.136; 280/124.138; 280/124.145; 280/124.149; 280/124.152; 180/908
(58) Field of Search ................... 280/124.135, 124.136, 280/124.138, 124.15, 124.145, 124.152, 124.149; 180/908, 348

(56) References Cited

U.S. PATENT DOCUMENTS

| | | | | |
|---|---|---|---|---|
| 2,876,018 A | * | 3/1959 | Kishline et al. ............. | 267/222 |
| 4,650,210 A | * | 3/1987 | Hirose et al. ................ | 180/215 |
| 4,757,872 A | * | 7/1988 | Inomata ....................... | 180/215 |
| 4,840,396 A | * | 6/1989 | Kubo .................. | 280/124.143 |
| 5,114,176 A | * | 5/1992 | Sawai .................. | 280/124.135 |
| 5,405,162 A | * | 4/1995 | Chun .................... | 280/124.135 |
| 5,415,427 A | * | 5/1995 | Sommerer et al. ..... | 280/124.135 |
| 5,431,429 A | * | 7/1995 | Lee ....................... | 280/124.136 |
| 5,513,874 A | * | 5/1996 | Mori .................... | 280/124.108 |
| 5,538,274 A | * | 7/1996 | Schmitz et al. ........... | 267/141.2 |
| 5,896,941 A | * | 4/1999 | Kajiwara et al. ............ | 180/253 |
| 5,934,696 A | * | 8/1999 | Bloser et al. ......... | 280/124.106 |
| 5,954,353 A | * | 9/1999 | Kincaid et al. ........ | 280/124.106 |
| 6,000,706 A | * | 12/1999 | Boberg et al. ......... | 280/124.135 |
| 6,105,984 A | * | 8/2000 | Schmitz et al. .............. | 180/256 |
| 6,113,120 A | * | 9/2000 | Heap .................... | 280/124.125 |
| 6,116,626 A | * | 9/2000 | Cherry et al. ................ | 188/329 |
| 6,161,853 A | * | 12/2000 | Jung ........................... | 267/249 |
| 6,412,797 B1 | * | 7/2002 | Park ..................... | 280/124.125 |
| 6,431,569 B2 | * | 8/2002 | Handa ................. | 280/124.138 |

* cited by examiner

*Primary Examiner*—Paul N. Dickson
*Assistant Examiner*—Deanna Draper
(74) *Attorney, Agent, or Firm*—Birch, Stewart, Kolasch & Birch, LLP

(57) ABSTRACT

A saddle type vehicle for attaining an appropriate weight distribution and a low centroid position. Suspension mechanisms are each composed of an upper arm and lower arms, the upper and lower arms being disposed in vertically spaced positions. A shock absorber is interposed between the upper arm and a body frame. A stabilizer is disposed between both suspension mechanisms. A lower end of the shock absorber is pivotably connected to the front-side lower arm, while an upper end of the shock absorber is pivotably connected to an inside position in the vehicular transverse direction of the body frame.

18 Claims, 6 Drawing Sheets

SADDLE TYPE VEHICLE

BACKGROUND OF THE INVENTION

1. Field of the Invention

The present invention relates to a saddle type vehicle and particularly to a saddle type vehicle having four wheels including wide and low pressure tires. The four wheels are driven to impart motion to the vehicle.

2. Description of Background Art

Heretofore, as a saddle type vehicle there is known, for example, a vehicle having such a structure as shown in FIG. 4. As illustrated in FIG. 4, a saddle type vehicle 1 is roughly composed of a body frame 3 with an engine 2 mounted centrally thereon. Four wheels 4 are disposed two on both sides of front and rear portions of the body frame 3. A steering bar handle 5 is provided for steering the wheels 4. The steering bar handle 5 is connected to a front upper portion of the body frame 3. A fuel tank 6 is mounted on the body frame 3 above the engine 2. A seat 7 is mounted behind the fuel tank 6.

For example, as shown in FIG. 5, each rear wheel 4 is supported by the body frame 3 which is vertically swingably through a suspension mechanism 8 which is secured to the body frame 3.

As shown in FIGS. 5 and 6, the suspension mechanism 8 is provided with an upper arm 10 secured swingably to brackets 9 which project from an outer side face of the rear portion of the body frame 3. A connecting rod 11 is connected swingably to a lower portion of the body frame 3 and extends obliquely backwards and outwardly therefrom. A knuckle 12 is connected to swing ends of both upper arm 10 and connecting rod 11, with the wheel 4 being rotatably secured to the knuckle 12. A shock absorber 13 is interposed between the body frame 3 and the upper arm 10.

The shock absorber 13, when seen in plan, is disposed along an axle of the wheel 4 and is swingably connected to the body frame 3 through a bracket 14 which is attached to an outer side portion of the body frame 3.

In order that a difference in a vertical movement between both the right and the left wheels does not become excessive, a stabilizer for suppressing this behavior is provided between both suspension mechanisms 8, though not shown. The stabilizer provides a connection between the upper arms 10 and is supported by the body frame 3.

In such a conventional saddle type vehicle 1 there remains the following problems to be solved. In the conventional saddle type vehicle 1, the connections between the shock absorbers 13 and the body frame 3 are positioned outside the body frame 3 and along the axles of the wheels 4, so that the shock absorbers 13 are spaced away from a centroid position of the vehicle and thus the vehicle weight distribution is not good.

Moreover, the stabilizer is located at an upper position of the suspension mechanisms 8. More specifically, at an upper position of the vehicle body and the shock absorbers 13 are fixed onto the upper arms 10. However, this construction is an obstacle to lowering the vehicular centroid position.

Further, as noted above, since the shock absorbers 13 are disposed outside the body frame 3, the space formed between each wheel 4 and the body frame 3 becomes narrow and, as shown in FIG. 6, it is required that a muffler 15 disposed within the said space be spaced away from the body frame 3. This point also affects the vehicular weight distribution.

SUMMARY AND OBJECTS OF THE INVENTION

It is an object of the present invention to provide a saddle type vehicle capable of attaining an appropriate weight distribution and a lowering of a vehicular centroid position.

For achieving the above-mentioned object, there is provided a saddle type vehicle including a body frame with an engine mounted centrally thereon. A pair of suspension mechanisms are vertically swingably mounted at both rear side portions of the body frame, with the wheels being secured to the suspension mechanisms. A power transfer mechanism is provided for transmitting an output of the engine to the wheels. The suspension mechanisms each comprise an upper arm and a lower arm which are formed in vertically spaced positions. A shock absorber is interposed between the lower arm and the body frame and a stabilizer is positioned between both suspension mechanisms. A lower end of the shock absorber is pivotably connected to a vehicular front side of the lower arm. An upper end portion of the shock absorber is pivotably connected to an inside position in the vehicular transverse direction of the body frame.

In addition, according to the present invention there is provided a saddle type vehicle wherein a vehicular front-side portion of the upper arm is positioned on a vehicular rear side with respect to a vehicular front-side portion of the lower arm, and the shock absorber is disposed on the front side of the upper arm.

Further, according to the present invention there is provided a saddle type vehicle wherein the stabilizer is disposed below the power transfer mechanism and is connected to the vehicular front-side portions of the right and left lower arms.

Another feature of the present invention is to provide a saddle type vehicle wherein the power transfer mechanism is provided with a final reduction gear for transmitting the output of the engine to the right and left wheels, the final reduction gear being mounted centrally in the transverse direction of the body frame.

The present invention also provides a saddle type vehicle wherein the power transfer mechanism is provided with a drive shaft which connects the engine and the final reduction gear with each other and which is connected to the engine and the final reduction gear through a universal joint.

Further, in accordance with the present invention there is provided a saddle type vehicle wherein a connection of the upper arm to the body frame is provided inside in the transverse direction of the body frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
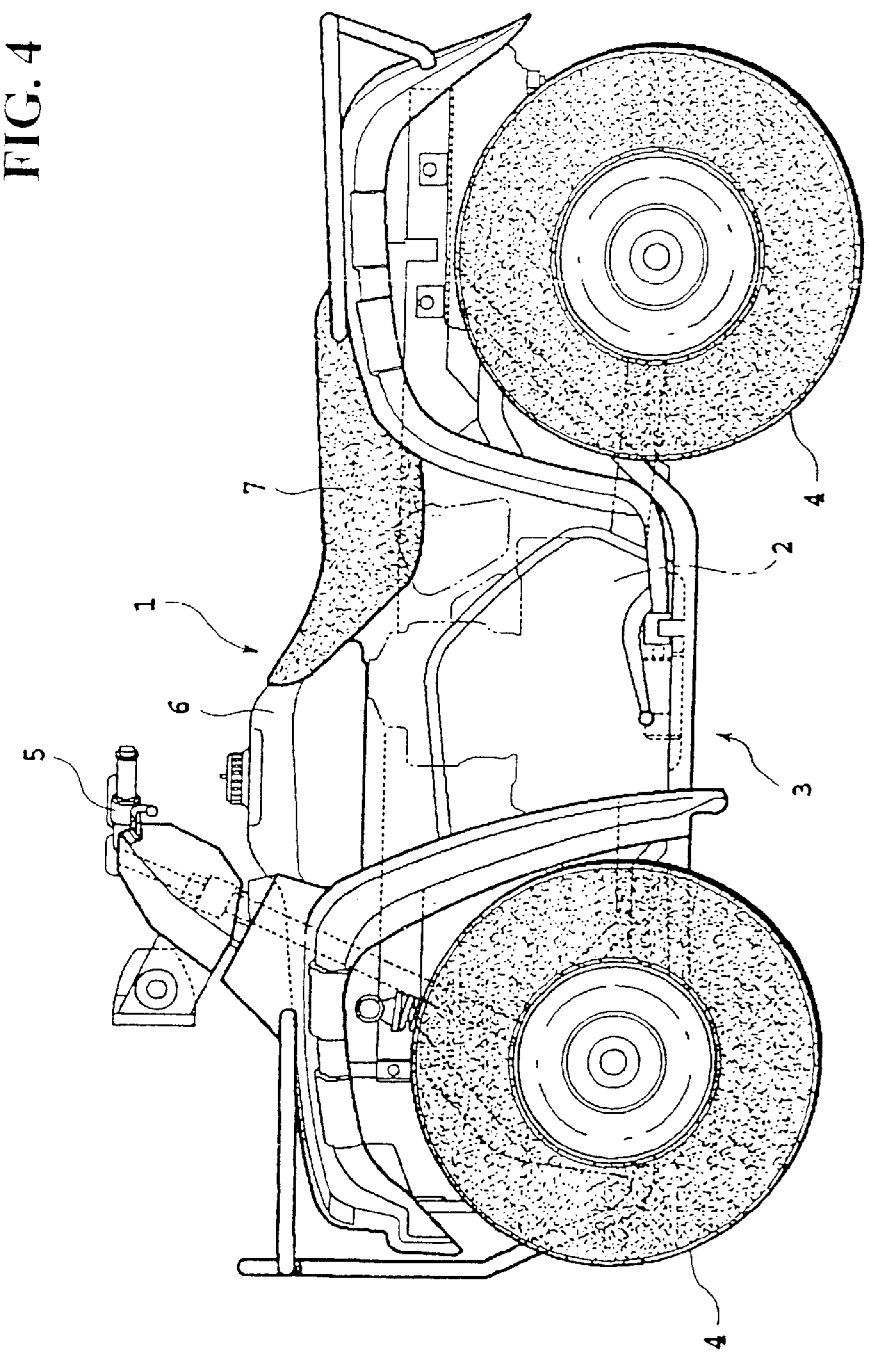
FIG. 4 is a side view showing a conventional saddle type vehicle.
Figure 5:
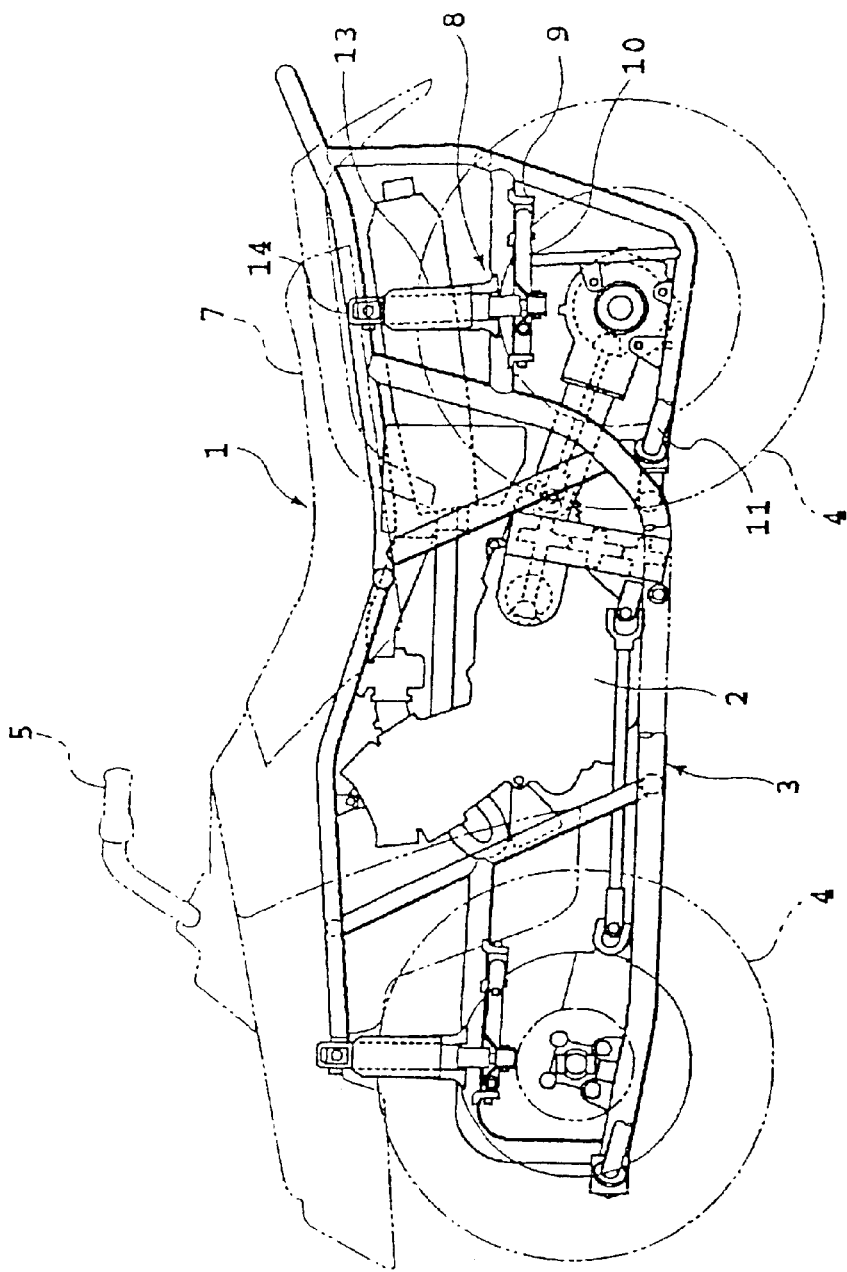
FIG. 5 is a side view showing a positional relation of components of the conventional vehicle.
Figure 6:
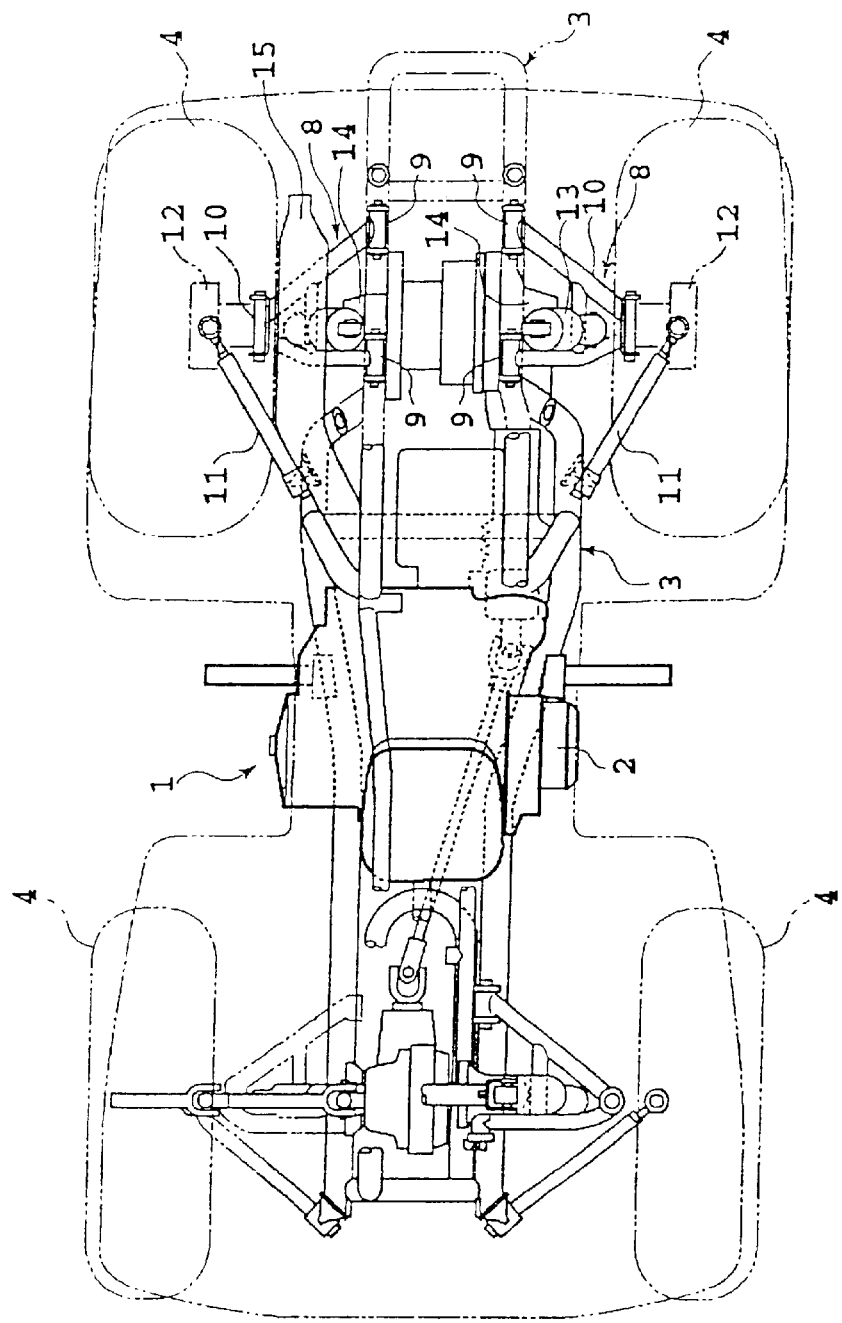
FIG. 6 is a plan view thereof.

An embodiment of the present invention will be described hereinunder with reference to FIGS. 1 to 3. In the following description, features that are common to the background art illustrated in FIGS. 4–6 will be identified by the same reference numerals and explanations thereof will be omitted.

Figure 1:
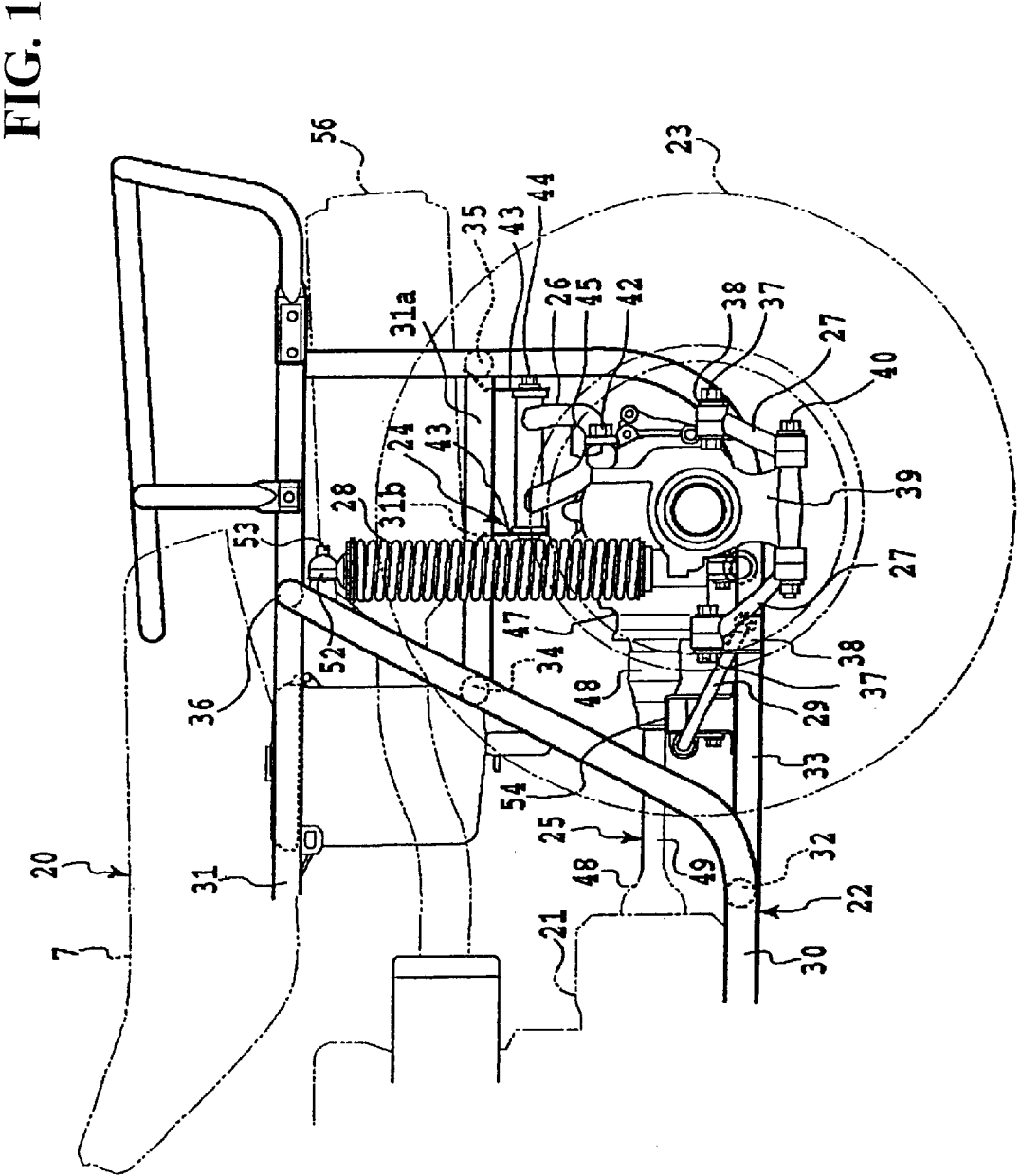
FIG. 1 is a side view of principal portions of a saddle type vehicle according to an embodiment of the present invention.
Figure 2:
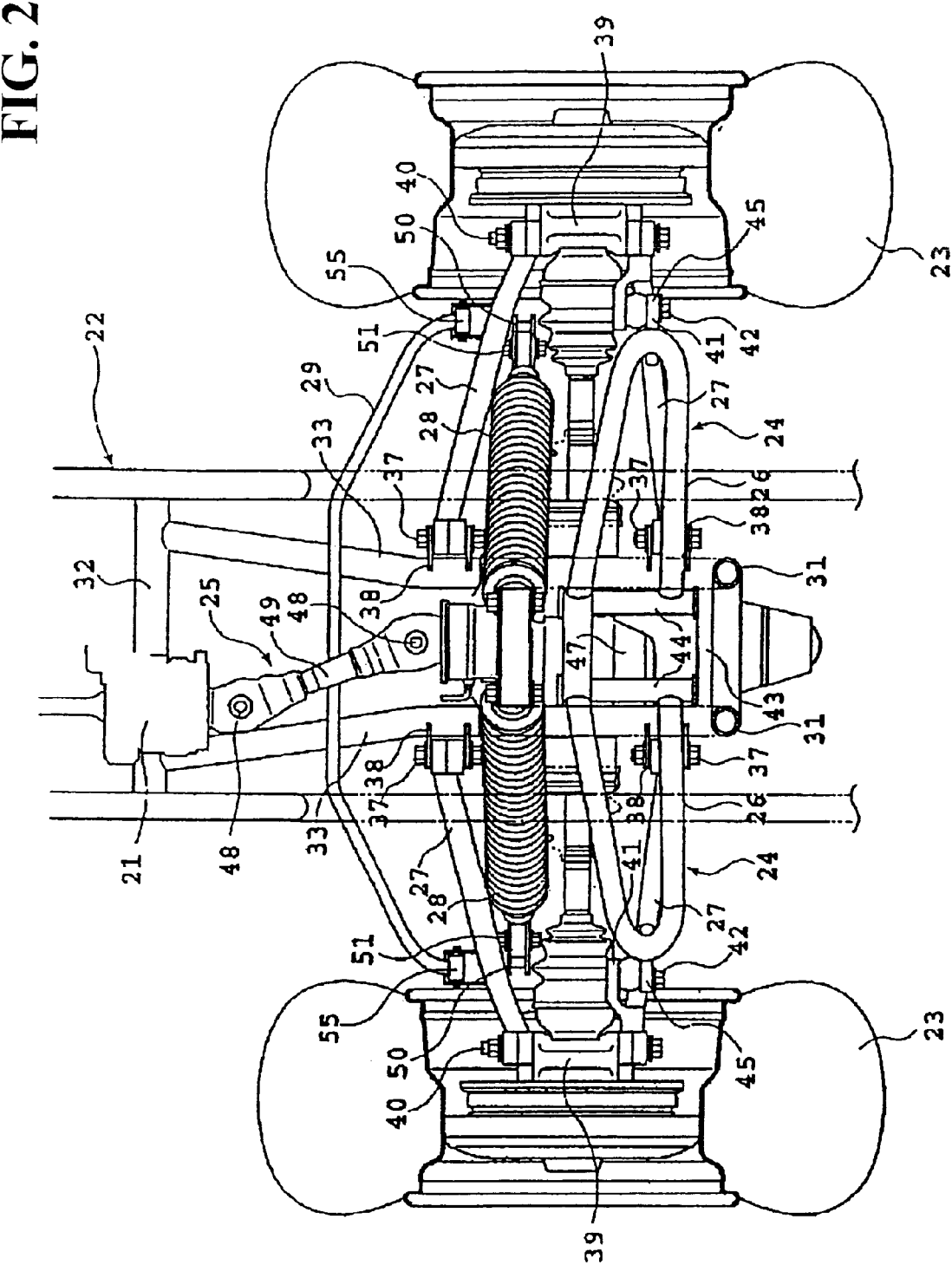
FIG. 2 is a plan view thereof.
Figure 3:
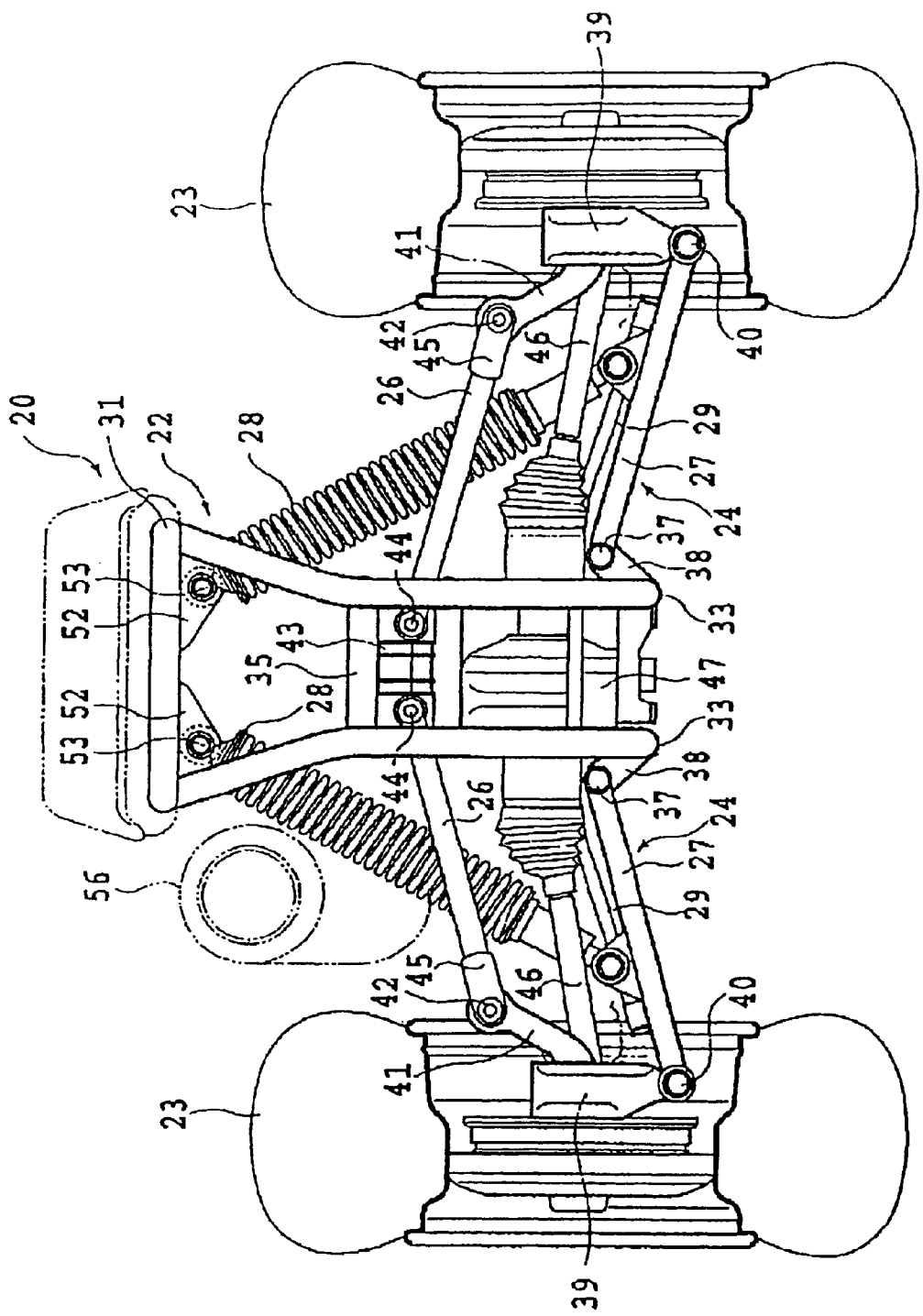
FIG. 3 illustrates the principal portions as seen from behind the vehicle.

In FIGS. 1–3 a saddle type vehicle 20 embodies the present invention. The saddle type vehicle 20 is provided with a body frame 22 with an engine 21 mounted centrally thereon. A pair of suspension mechanisms 24 are vertically swingably mounted at both rear side portions of the body frame 22 with wheels 23 and a power transfer mechanism 25 for transmitting an output of the engine 21 to the wheel being secured thereto. The suspension mechanisms 24 are each roughly composed of an upper arm 26 and a lower arm 27 which are formed in vertically spaced positions. A shock absorber 28 is interposed between the lower arm 27 and the body frame 22. A stabilizer 29 is disposed between both of the suspension mechanisms 24. A lower end portion of the shock absorber 28 is pivotably connected to a vehicular front side of the lower arm 27, while an upper end portion of the shock absorber 28 is pivotably connected to an inside position in the vehicular transverse direction of the body frame 22.

A description will now be given in more detail. The body frame 22 is made up of a pair of parallel under pipes 30 on which is mounted the engine 21, a pair of parallel seat pipes 31 disposed above the under pipes 30, and a plurality of cross pipes for connecting those pipes which are positioned right and left.

As shown in FIG. 1, rear end portions of the under pipes 30 are bent upwardly towards the seat pipes 31 and are connected to the seat pipes 31, respectively.

To a cross pipe 32 connected to rear bent portions of the under pipes 30 are connected a pair of parallel rear pipes 33 extending respectively along extension lines of the under pipes 30. Rear end portions of the rear pipes 33 are bent upward and are connected respectively to the seat pipes 31 at positions close to rear end portions of the seat pipes 31.

Cross pipes 34 and 35 form connections between right and left under pipes 30 and between right and left rear pipes 33 and are mounted respectively between nearly intermediate positions of the rear rising portions of the under pipes 30 and between nearly intermediate positions of the rear rising portions of the rear pipes 33.

A cross pipe 36 is mounted between the connections of the under pipes 30 with the seat pipes 31 to connect the right and left seat pipes 31 with each other.

As shown in FIG. 2, pivot shafts 37 each having an axis extending in the longitudinal direction of the vehicle body are secured to side portions of the rear pipes 33 respectively through brackets 38. On each of right and left sides of the vehicle body, two pivot shafts 37 and two brackets 38 are mounted in longitudinally spaced positions. A pair of lower arms 27 are disposed so as to be swingably connected at one end portions thereof to the pivot shafts 37 respectively.

A lower portion of a knuckle 39, which rotatably supports a wheel 23, is connected to swing ends of the lower arms 27 pivotably through a pivot shaft 40.

As shown in FIG. 3, an upwardly extending connecting piece 41 is integral with a vehicular rear-side portion of the knuckle 39, and a swing end of the upper arm 26 is connected to an end portion of the connecting piece 41 pivotably through a pivot shaft 42.

On the other hand, a pair of parallel auxiliary pipes 31a are mounted between both cross pipes 34 and 35 and a cross pipe 31b is secured to nearly intermediate portions of the auxiliary pipes 31a.

As shown in FIG. 2, the upper arm 26 is formed in a generally U-shape, and as shown in FIG. 1, both ends thereof are connected pivotably through pivot shafts 44 to brackets 43 which are mounted on the cross pipes 35 and 31b, respectively.

As shown in FIG. 3, the pivot shafts 44 are positioned inside with respect to the seat pipes 31.

As shown in FIG. 2, a connecting plate 45 is integral with a swing end of the upper arm 26. The connecting plate 45 is connected pivotably to a pivot shaft 42 which is secured to the connecting piece 41 of the knuckle 39. In this way the upper arm 26 and the knuckle 39 are pivotably connected together.

A drive shaft 46 is mounted so as to transmit rotation to the wheel 23 secured to the knuckle 39 and one end of the drive shaft 46 is supported by the knuckle 39.

The drive shaft 46, which is provided for each of the right and left wheels 23, is connected to a final reduction gear 47 which is constituted by a differential gear fixed to the rear pipes 33.

In this embodiment, as shown in FIG. 2, the final reduction gear 47 is positioned nearly centrally in the transverse direction of the vehicle body.

As shown in FIG. 2, the final reduction gear 47 is connected to the engine 21 through a pair of universal joints 48 and a propeller shaft 49. In this embodiment, the power transfer mechanism 25 includes the universal joints 48, drive shafts 46, propeller shaft 49 and final reduction gear 47.

A vehicular front side of the upper arm 26 is positioned behind the lower arms 27, whereby an open space is ensured above the vehicular front side of the lower arms 27.

As shown in FIGS. 2 and 3, a bracket 50 is attached to the front lower arm 27 at a longitudinally intermediate position, and the lower end of the shock absorber 28 is pivotably connected to the bracket 50 through a pivot shaft 51.

The upper end of the shock absorber 28 is pivotably connected to a bracket 52 through a pivot shaft 53. The bracket 52 is mounted below the cross pipe 36 which is mounted between the seat pipes 31.

The upper end of the shock absorber 28 thus mounted is positioned inside the body frame 22 and in front of the upper arm 26.

As shown in FIG. 2, the stabilizer 29 extends across the body frame 22 and projects to both sides of the body frame. As shown in FIG. 1, the stabilizer 29 is positioned below the propeller shaft 49 which connects the engine 21 and the final reduction gear 47 with each other.

As shown in FIG. 2, the stabilizer 29 is supported at an intermediate position thereof by a bracket 54 which is mounted bridgewise between the rear pipes 33. Both ends thereof are pivotably connected to the front sides of intermediate portions of the lower arms 27 through pivot shafts 55.

In the saddle type vehicle 20 of this embodiment thus constructed, the shock absorbers 28 are each positioned ahead of the upper arm 26, that is, ahead of the axle of the wheel 23.

Thus, since the shock absorber 28 is mounted at a position close to the engine 21 side, it is more approximate to the vehicular centroid position and the vehicular weight distribution is very much improved.

Besides, since the upper end of the shock absorber 28 is supported inside the seat pipes 31 and the lower end thereof is supported at a longitudinally intermediate position of the front-side lower arm 27, the space between the shock absorber 28 and the wheel 23 is expanded.

Consequently, the freedom of layout of a muffler 56 (see FIG. 3) extending rearwardly of the vehicle body from the engine 21 is enhanced.

In this embodiment, moreover, since the final reduction gear 47 is mounted at an intermediate position in the transverse direction of the vehicle body, both drive shafts 46 which connect the final reduction gear with the wheels 23 become equal in length and also become equal in swing angle against vertical motions of the wheels 23.

Further, since the stabilizer 29 is positioned near the engine 21 and below the body frame 22 and, as noted previously, since the shock absorbers 28 are each secured to the associated lower arm 27 and are thus located at a low position, the centroid position of the vehicle can be lowered.

The shapes and sizes of the components used in the above embodiment are only an example and may be changed in accordance with requests in design, etc.

Since the present invention is constructed as above, it is possible to approximate the shock absorbers to the vehicular centroid position and attain a more ideal vehicular weight distribution.

Moreover, since the space between each shock absorber and each wheel is expanded, it is possible to enhance the layout freedom of devices installed within the space.

Further, since the shock absorbers and the stabilizer are disposed at positions as low as possible on the vehicle body, it is possible to lower the vehicular centroid position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle including a body frame with an engine mounted centrally thereon, a pair of right and left suspension mechanisms vertically swingably mounted at right and left rear side portions of said body frame, with right and left wheels being secured to said right and left suspension mechanisms, respectively, and a power transfer mechanism for transmitting an output of said engine to said wheels, comprising:

an upper arm and a lower arm formed in vertically spaced positions on each of said right and left suspension mechanisms, said upper arms being connected to said body frame under cross pipes of said frame;

right and left shock absorbers interposed between said lower arms and said body frame, lower end portions of said shock absorbers being pivotably connected to front sides of said lower arms, and upper end portions of said shock absorbers being pivotably connected upwardly and inwardly relative to said lower end portions to inside positions of said body frame; and a stabilizer positioned between said right and left suspension mechanisms.

2. The saddle vehicle according to claim 1, wherein front sides of said upper arms are positioned rearwardly with respect to the front sides of said lower arms, said shock absorbers being disposed forwardly of the upper arms.

3. The saddle vehicle according to claim 2, wherein said stabilizer is disposed below said power transfer mechanism and is connected to the front sides of the lower arms.

4. The saddle vehicle according to claim 2, wherein said power transfer mechanism is provided with a final reduction gear for transmitting the output of the engine to the right and left wheels, said final reduction gear being mounted centrally in said body frame.

5. The saddle vehicle according to claim 4, wherein said final reduction gear connects to said engine via a pair of universal joints and a propeller shaft.

6. The saddle vehicle according to claim 1, wherein said stabilizer is disposed below said power transfer mechanism and is connected to the front sides of the lower arms.

7. The saddle vehicle according to claim 6, wherein said power transfer mechanism is provided with a final reduction gear for transmitting the output of the engine to the right and left wheels, said final reduction gear being mounted centrally in said body frame.

8. The saddle vehicle according to claim 7, wherein said final reduction gear connects to said engine via a pair of universal joints and a propeller shaft.

9. The saddle vehicle according to claim 1, wherein said power transfer mechanism is provided with a final reduction gear for transmitting the output of the engine to the right and left wheels, said final reduction gear being mounted centrally in said body frame.

10. The saddle vehicle according to claim 9, wherein said final reduction gear connects to said engine via a pair of universal joints and a propeller shaft.

11. A suspension mechanism for a saddle vehicle comprising:

a first suspension mechanism including a first upper arm and a first lower arm, said first upper arm and said first lower arm being formed in vertically spaced positions;

a first shock absorber interposed between said first lower arm and a body frame;

a second suspension mechanism including a second upper arm and a second lower arm, said second upper arm and said second lower arm being formed in vertically spaced positions;

a second shock absorber interposed between said second lower arm and said body frame, lower end portions of said first and second shock absorbers being pivotably connected to front sides of said lower arms, and upper end portions of said first and second shock absorbers being pivotably connected to inside positions of said body frame;

a stabilizer positioned between both said first and second suspension mechanisms; and a power transfer mechanism provided with a final reduction gear for transmitting an output of the engine to a pair of right and left wheels, said final reduction gear being mounted centrally in said body frame.

12. The suspension mechanism for a saddle vehicle according to claim 11, wherein front sides of said first and second upper arms are positioned rearwardly with respect to the front sides of said lower arms, and said first and second shock absorbers are disposed on the front sides of the first and second upper arms.

13. The suspension mechanism for a saddle vehicle according to claim 12, wherein said stabilizer is disposed below said power transfer mechanism and is connected to the front sides of the first and second lower arms.

14. The suspension mechanism for a saddle vehicle according to claim 11, wherein said stabilizer is disposed below said power transfer mechanism and is connected to the front sides of the first and second lower arms.

15. The saddle vehicle according to claim 11, wherein said power transfer mechanism is provided with a drive shaft which connects said engine to said final reduction gear via a universal joint.

16. A saddle vehicle including a body frame with an engine mounted centrally thereon, a pair of right and left suspension mechanisms vertically swingably mounted at said right and left suspension mechanisms each right and left rear side portions of said body frame, with right and left wheels being secured to said right and left suspension mechanisms, and a power transfer mechanism for transmitting an output of said engine to said wheels, comprising:

an upper arm and a lower arm formed in vertically spaced positions on each of said right and left suspension mechanisms, each of said upper arms being connected to said body frame under cross pipes of said frame, and each of said lower arms including a pair of lower arms extending between a pivot shaft on the body frame and another pivot shaft attached to a knuckle, the pivot shafts having longitudinal directions which are parallel to a length of the body frame;

right and left shock absorbers interposed between said lower arms and said body frame, lower end portions of said shock absorbers being pivotably connected to front sides of said lower arms, and upper end portions of said shock absorbers extending inwardly and being pivotably connected to said body frame at positions under said cross pipe; and a stabilizer positioned between said right and left suspension mechanisms.

17. The saddle vehicle according to claim 16, wherein said stabilizer is disposed below said power transfer mechanism and is connected to the front sides of the lower arms.

18. The saddle vehicle according to claim 17, wherein said power transfer mechanism is provided with a final reduction gear for transmitting the output of the engine to the right and left wheels, said final reduction gear being mounted centrally in said body frame.

* * * * *